United States Patent [19]
Reed

[11] Patent Number: 6,149,369
[45] Date of Patent: Nov. 21, 2000

[54] TRAILER WITH TILTABLE BED

[76] Inventor: Laurence Reed, 12150 E. Houghton Lake Dr., Houghton Lake, Mich. 48629-9694

[21] Appl. No.: 09/093,940

[22] Filed: Jun. 9, 1998

[51] Int. Cl.[7] .................................................. B60P 1/04
[52] U.S. Cl. ........................ 414/480; 254/4 R; 414/537; 414/483
[58] Field of Search ..................... 254/4 R, 4 B, 254/4 C; 280/789; 414/495, 537, 538, 482, 469, 480, 483, 484, 485, 494; 14/71.1; 410/3

[56] References Cited

U.S. PATENT DOCUMENTS

| | | | |
|---|---|---|---|
| 2,121,153 | 6/1938 | Konicek | 414/485 |
| 2,230,014 | 1/1941 | Raven . | |
| 2,745,567 | 5/1956 | Groves . | |
| 2,856,091 | 10/1958 | Johnson . | |
| 2,954,137 | 9/1960 | Ash | 414/483 |
| 2,990,966 | 7/1961 | Schramm . | |
| 3,043,609 | 7/1962 | Talbert | 414/483 X |
| 3,460,696 | 8/1969 | Owens, Jr. . | |
| 3,860,255 | 1/1975 | Rodriguez . | |
| 3,901,398 | 8/1975 | Bunch . | |
| 4,319,862 | 3/1982 | Cook | 414/483 X |
| 4,490,089 | 12/1984 | Welker . | |
| 4,659,100 | 4/1987 | Welker . | |
| 4,685,855 | 8/1987 | Celli . | |
| 5,051,053 | 9/1991 | Groeneweg . | |
| 5,308,213 | 5/1994 | Gilbertson . | |
| 5,362,195 | 11/1994 | Wagner | 414/483 |
| 5,474,416 | 12/1995 | Rogge et al. . | |
| 5,649,802 | 7/1997 | Babcock . | |

FOREIGN PATENT DOCUMENTS

| | | | |
|---|---|---|---|
| 1154794 | 4/1958 | France | 414/480 |

OTHER PUBLICATIONS 10-ton capacity ultra low loader mechanical handling publication—pp. 37 and 39—copy in 414/480—Jan. 1962.

*Primary Examiner*—Frank E. Werner
*Attorney, Agent, or Firm*—Mary M. Moyne; Ian C. McLeod

[57] ABSTRACT

A trailer (10, 210 or 310) having a tilting bed (26, 226 or 326) is described. The bed has a front portion (26A) and a back portion (26B) which are pivotably mounted together. The front portion is fixably mounted to the frame (12, 212 or 312) of the trailer. The back portion is able to be lowered to form a ramp for loading and unloading the trailer. A cable and pulley system (40, 240 or 340) is used to raise and lower the back portion of the bed. The cable(s) (50, 250, 251 or 350) of the cable and pulley system can be loosened or tightened using either a winch (52) or a hydraulic winch (266 or 366). The pivot point of the back portion is located in front of the axle (16) of the trailer which creates a longer leverage arm which allows for easier lifting of the back portion of the bed.

25 Claims, 10 Drawing Sheets

TRAILER WITH TILTABLE BED

BACKGROUND OF THE INVENTION

(1) Field of the Invention

The present invention relates to a trailer having a tilting bed which allows for easier loading and unloading of the trailer. In particular, the present invention relates to a trailer having a tilting bed constructed of two portions which are pivotably connected together. A pulley and cable system allows for easier raising and lowering of the back portion of the bed of the trailer.

(2) Description of the Related Art

The related art has shown various trailers having tilting or pivoting beds. Illustrative are U.S. Pat. No. 2,745,567 to Groves; U.S. Pat. No. 3,460,696 to Owen, Jr. and U.S. Pat. No. 5,051,053 to Groeneweg.

Groves describes a boat trailer having a base frame and a boat frame pivotably mounted on the axle of the trailer. The boat frame and base frame are tilted about the axle by increasing the tension on a cord which is engaged at one end to the connection of the horizontal boat frame arm with the vertical arm of the boat frame and at the other end to a pulley. Rotation of a winch having the pulley pivots the boat frame and base frame upwardly.

Owen, Jr. shows a trailer with a tail gate which can be used as a ramp. When the tail gate is being used as a ramp, a cable and a side winch may be used to raise and lower the tail gate.

Groeneweg shows a trailer having a tilting bed which is pivotably connected directly above the axle of the trailer.

Also of interest are U.S. Pat No. 2,230,014 to Raven; U.S. Pat. No. 3,860,255 to Rodriguez; U.S. Pat. No. 4,490,089 to Welker; 4,659,100 to Welker; 4,685,855 to Celli; U.S. Pat. No. 5,308,213 to Gilbertson; U.S. Pat. No. 5,474,416 to Rogge et al and U.S. Pat. No. 5,649,802 to Babcock which show trailers having beds which can be completely lowered onto the ground surface.

In particular, Rodriguez shows a trailer having a bed fixed to a secondary frame where the secondary frame is able to be lowered to lie flat on the ground while the main frame pivots about the axis of the wheels and assumes a forwardly upwardly extending altitude.

In addition, Welker shows a trailer where the main load supporting member (bed) is lowered to ground level by raising the main structure portion of the trailer.

Further, Gilbertson shows a trailer where the front end of the frame tilts to allow the front end of the support bed to be lowered to the ground.

Only of minimal interest are U.S. Pat. No. 2,856,091 to Johnson; U.S. Pat. No. 2,990,966 to Schramm and U.S. Pat. No. 3,901,398 to Bunch which show trailers having pivot points on the trailer frame which allow for tilting the bed for easier loading and unloading.

There remains the need for a trailer having a tiltable bed which allows for easily raising and lowering of the bed without having to disconnect the trailer hitch from the vehicle and which allows for the use of minimal force to tilt the bed by using a long lever arm and by tilting only a back portion of the bed.

OBJECTS

It is therefore an object of the present invention to provide a trailer having a bed which is able to be tilted to provide easier loading and unloading of the trailer. Further, it is an object of the present invention to provide a trailer having a bed which has a fixed front portion and a back portion which tilts to form a ramp. Still further, it is an object of the present invention to provide a trailer which has a pulley and cable system which allows for easier raising and lowering of the back portion of the bed. Further still, it is an object of the present invention to provide a trailer which uses a winch on the tongue of the trailer to raise and lower the back portion of the bed. Further, it is an object of the present invention to provide a method of loading and unloading a trailer without disconnecting the trailer from the trailer hitch of a vehicle.

These and other objects will become increasingly apparent by reference to the following drawings and the description.

DETAILED DESCRIPTION OF THE PREFERRED EMBODIMENTS

Figure 1:
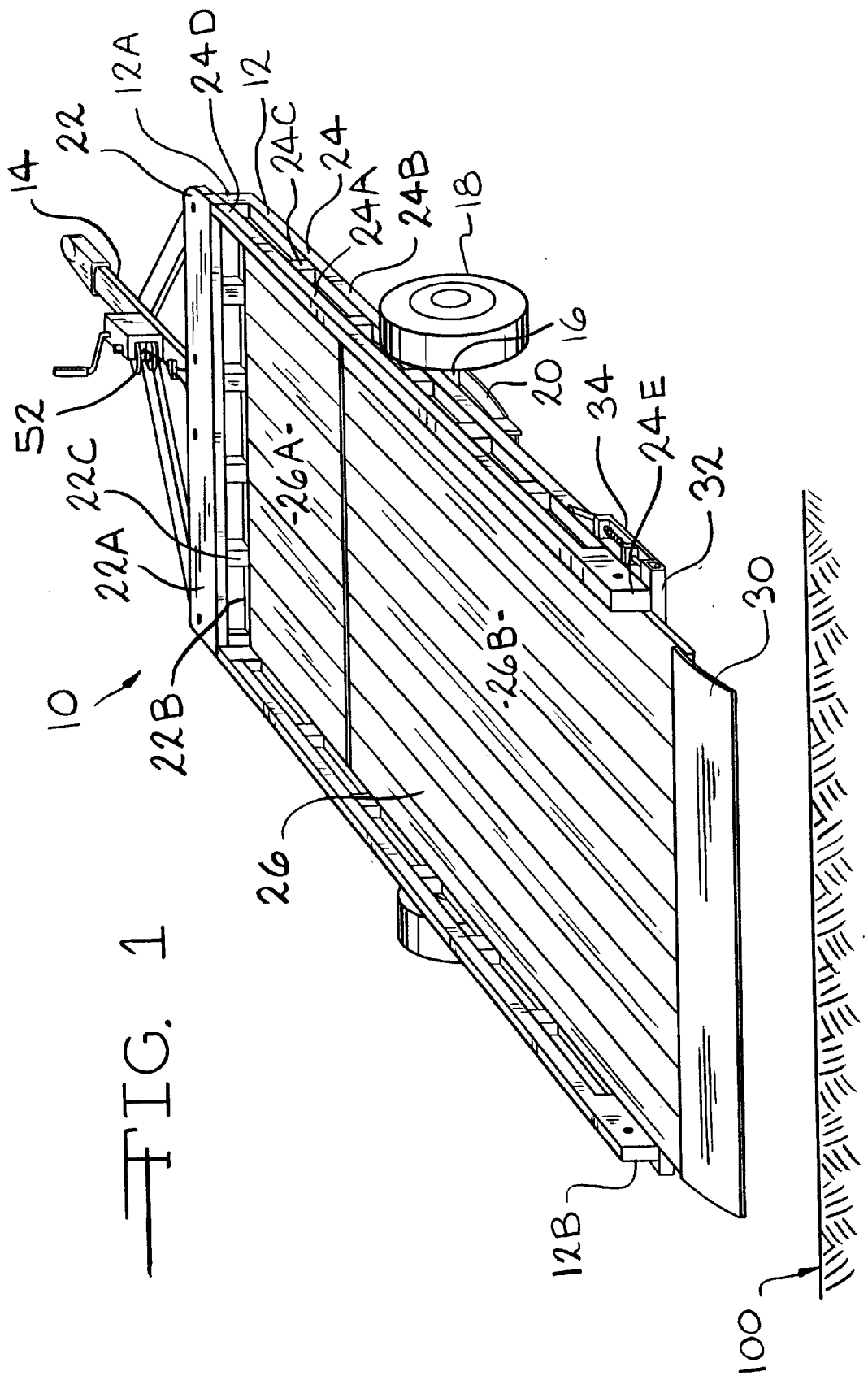
FIG. 1 is a perspective view of the trailer 10 of the present invention with the bed 26 in the raised position.

The present invention relates to a trailer which comprises: a frame having a first end and a second end with side members extending therebetween; a tongue assembly mounted on the first end of the frame for connecting the trailer to a vehicle; an axle having opposed ends and attached to and extending between the side members of the frame with wheels rotatably mounted on the opposed ends of the axle adjacent the side members of the frame; a bed having a first portion and a second portion, each portion having first and second ends, the first portion being mounted at the first end to the first end of the frame and the second portion being pivotably connected at the first end to the second end of the first portion wherein a connection point of the first and second portions of the bed is spaced between the front end of the frame and the axle; and pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a lifting means mounted on the second end of the frame and connected to the second portion of the bed.

Further, the present invention relates to a trailer which comprises: a frame having a first end and a second end with side members extending therebetween; a tongue assembly mounted on the first end of the frame for connecting the trailer to a vehicle; an axle having opposed ends and attached to and extending between the side members of the frame with wheels rotatably mounted on the opposed ends of the axle adjacent the side members of the frame; a bed having a first portion and a second portion, each portion having first and second ends, the first portion being mounted at the first end to the first end of the frame and the second portion being pivotably connected at the first end to the second end of the first portion; and pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a cable having opposed ends and attached at one end to the second portion of the bed, a winch means attached to the other end of the cable and mounted adjacent the first end of the first portion of the bed for tightening and loosening the cable and a first cable guide mounted adjacent the second end of the frame wherein the cable extends over the first cable guide and wherein the first cable guide acts to change a direction of the cable.

Still further, the present invention relates to a trailer which comprises: a frame having a first end and a second end with side members extending therebetween; a tongue assembly mounted on the first end of the frame for connecting the trailer to a vehicle; an axle having opposed ends and attached to and extending between the side members of the frame with wheels rotatably mounted on the opposed ends of the axle adjacent the side members of the frame; a bed having a first portion and a second portion, each portion having first and second ends, the first portion being mounted at the first end to the first end of the frame and the second portion being pivotably connected at the first end to the second end of the first portion; and pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a pair of cables having opposed ends and extending from the first end of the frame to the second end of the frame along each of the side members, a winch means connected to one end of the cables for tightening and loosening the cables and at least one pair of cable guides for changing the direction of the cables.

Further still, the present invention relates to a method for loading an object on a trailer for towing by a vehicle, which comprises the steps of: providing the trailer having a frame having a first end and a second end with side members extending therebetween; a tongue assembly mounted on the first end of the frame for connecting the trailer to a vehicle; an axle having opposed ends and attached to and extending between the side members of the frame with wheels rotatably mounted on the opposed ends of the axle adjacent the side members of the frame; a bed having a first portion and a second portion, each portion having first and second ends, the first portion being mounted at the first end to the first end of the frame and the second portion being pivotably connected at the first end to the second end of the first portion wherein a connection point of the first and second portions of the bed is spaced between the front end of the frame and the axle; and pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a lifting means mounted on the second end of the frame and connected to the second portion of the bed; moving the second portion of the bed to the load position using the lifting means such that the second end of the second portion of the bed is adjacent the ground surface; moving the object onto the bed of the trailer; and moving the second portion of the bed to the raised position using the lifting means such that the second end of the second portion of the bed is spaced above the ground surface.

Finally, the present invention relates to a method for loading an object on a trailer for towing by a vehicle, which comprises the steps of: providing the trailer having a frame having a first end and a second end with side members extending therebetween; a tongue assembly mounted on the first end of the frame for connecting the trailer to a vehicle; an axle having opposed ends and attached to and extending between the side members of the frame with wheels rotatably mounted on the opposed ends of the axle adjacent the side members of the frame; a bed having a first portion and a second portion, each portion having first and second ends, the first portion being mounted at the first end to the first end of the frame and the second portion being pivotably connected at the first end to the second end of the first portion; and pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a cable having opposed ends and attached at one end to the second portion of the bed, a winch means attached to the other end of the cable and mounted adjacent the first end of the first portion of the bed for tightening and loosening the cable and a first cable guide mounted adjacent the second end of the frame wherein the cable extends over the first cable guide and wherein the first cable guide acts to change a direction of the cable; moving the second portion of the bed to the load position by moving the winch means to loosen the cable such that the second end of the second portion of the bed is adjacent the ground surface; moving the object onto the bed of the trailer; and moving the second portion of the bed to the raised position by moving the winch means to tighten the cable such that the second end of the second portion of the bed is spaced above the ground surface.

Figure 2:
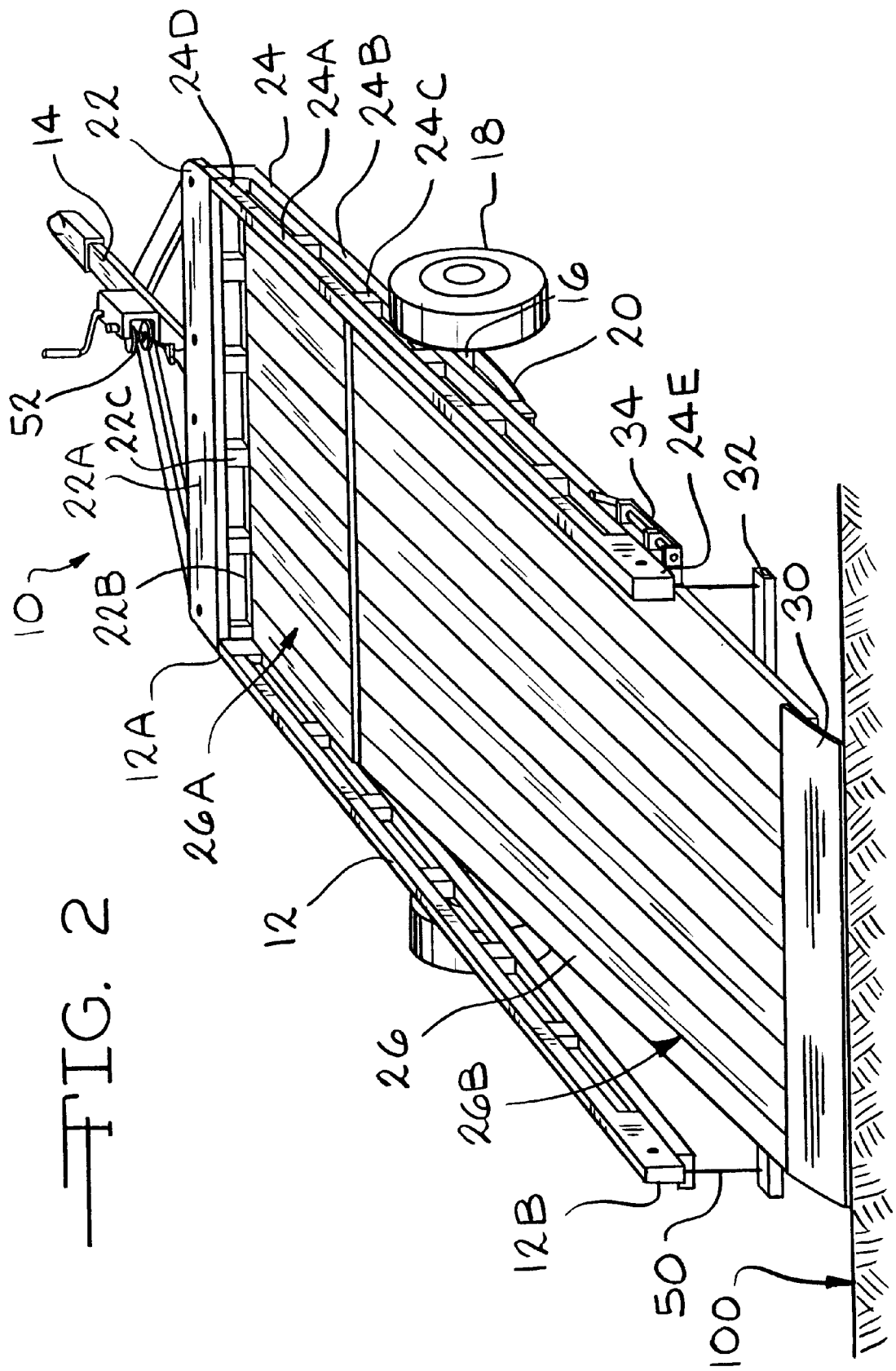
FIG. 2 is a perspective view of the trailer 10 with the bed 26 in the lowered position.
Figure 3:
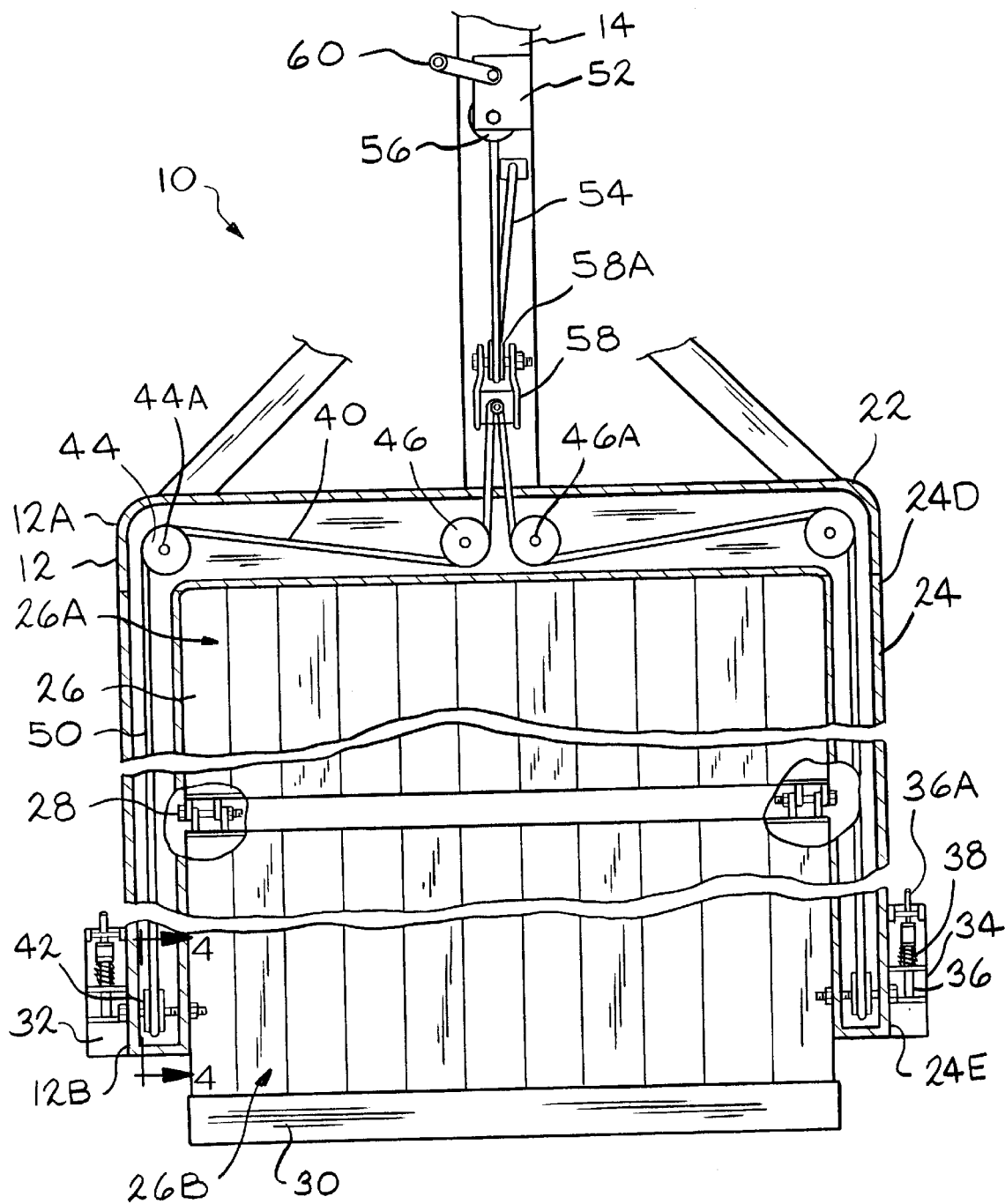
FIG. 3 is a top cross-sectional view of the trailer 10 showing the pulley and cable system 40 with a cutaway portion showing the hinges 28 connecting the front portion 26A and the back portion 26B of the bed 26.
Figure 4:
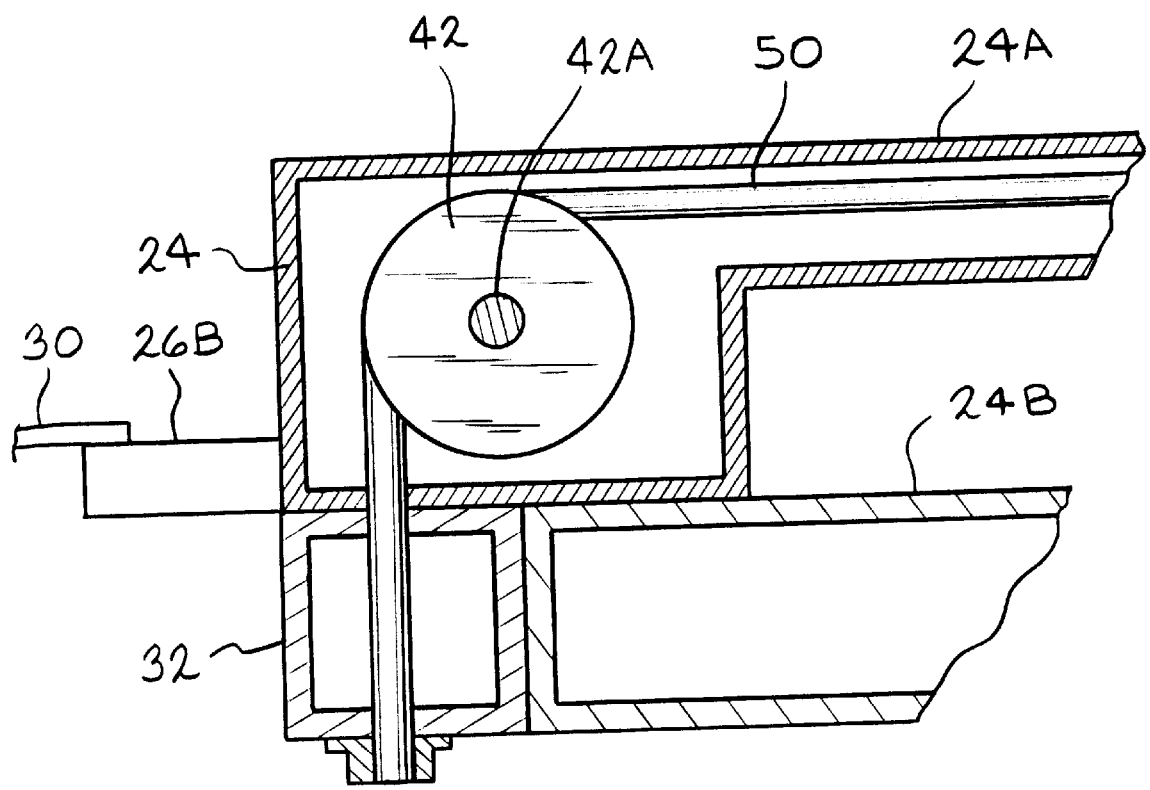
FIG. 4 is a cross-sectional view along line 4—4 of FIG. 3 showing the first pulley wheel 42 and the cable 50 connected to the cross bar 32 at the back portion 26B of the bed 26.

FIGS. 1 to 3 show the trailer 10 of the first embodiment of the present invention. The trailer 10 is preferably similar to standard trailers and has a frame 12 with a tongue 14 mounted on the front end 12A of the frame 12 and an axle 16 with a pair of wheels 18 mounted at about the center of the frame 12. The trailer 10 also includes a split bed 26 and a pulley and cable system 40. The frame 12 of the trailer 10 has a front rail 22 extending along the front end 12A of the frame 12 and two (2) parallel side rails 24 extending between the front and back ends 12A and 12B of the frame 12. The side rails 24 are mounted at the first end 24D to the ends of the front rail 22. The front rails 22 preferably include an upper front rail 22A and a lower front rail 22B. The side rails 24 preferably include an upper side rail 24A and a lower side rail 24B. However, the front and side rails 22 and 24 could also be constructed with only a single rail. The upper and lower rails 22A, 24A, 22B and 24B extend parallel to each other respectively, and are connected together at various positions by vertical connectors 22C and 24C. The front and side rails 22 and 24 can also be provided with upper railings (not shown) which provide the trailer 10 with higher sides to form an enclosed area. The lower side rails 24B are preferably connected by springs 20 to the axle 16 of the trailer 10 with the wheels 18 mounted on the axle 16 adjacent each of the side rails 24. The upper rails 22A and 24A of the front and side rails 22 and 24 are preferably hollow. The upper front rail 22A preferably has a width and a thickness across the entire length which allows for enclosure of the second and third pulley wheels 44 and 46 within the upper front rail 22A and free rotation of the pulley wheels 44 and 46 within the front rail 22 (to be described in detail hereinafter) (FIG. 3). The end of the upper side rails 24A opposite the front rail 22 is preferably enlarged to allow for enclosure of the first pulley wheel 42 (to be described in detail hereinafter) (FIG. 4). Completely enclosing the pulley wheels 42, 44 and 46 and cable 50 within the rails 22 and 24 prevents dirt and debris from entering the system 40 and prevents accidental interference with the system 40 during use and reduces the risk of injury to the user.

The split bed 26 of the trailer 10 is made up of a front portion 26A and a back portion 26B. The bed 26 preferably extends the entire length of the frame 12 from the front rail 22 of the frame 12 to beyond the second ends 24B of the side rails 24. The bed 26 preferably extends the entire width between the side rails 24 of the frame 12. The front portion 26A of the bed 26 is fixably mounted to the side rails 24 and the front rail 22. The front portion 26A preferably extends from the front rail 22 to a point slightly in front of the axle 16 of the wheels 18. The back portion 26B of the bed 26 is pivotably connected to the end of the front portion 26A opposite the front rail 22. The front and back portions 26A and 26B of the bed are pivotably connected together by a pair of hinges 28 (FIG. 3). The back portion 26B of the bed 26 extends outward away from the front portion 26A of the bed 26 beyond the second end of the side rails 24.

The end of the back portion 26B of the bed 26 opposite the front portion 26A is provided with a ramp 30 to allow for easier loading onto the bed 26. A cross bar 32 is mounted adjacent the ramp 30 on the bottom surface of the back portion 26B of the bed 26. The cross bar 32 extends parallel to the front rail 22 of the frame 12 and extends beyond the sides of the bed 26 such that when the back portion 26B of the bed 26 is in the raised position, the ends of the cross bar 32 extend beyond the side rails 24 of the frame 12 (FIG. 1). In the preferred embodiment, the bed 26 has a total length of 136.0 inches (345.4 cm) with the front portion 26A having a length of about 43.0 inches (109.2 cm) and the back portion 26B having a length of about 92.0 inches (233.7 cm). In the preferred embodiment, the hinge 28 connecting the front portion 26A of the bed 26 to the back portion 26B of the bed 26 is spaced a distance of 25.0 inches (63.5 cm) from the axle 16 of the wheels 18 toward the front end 12A of the trailer 10. The bed 26 can be constructed in any well known manner of any well known materials.

Figure 5:
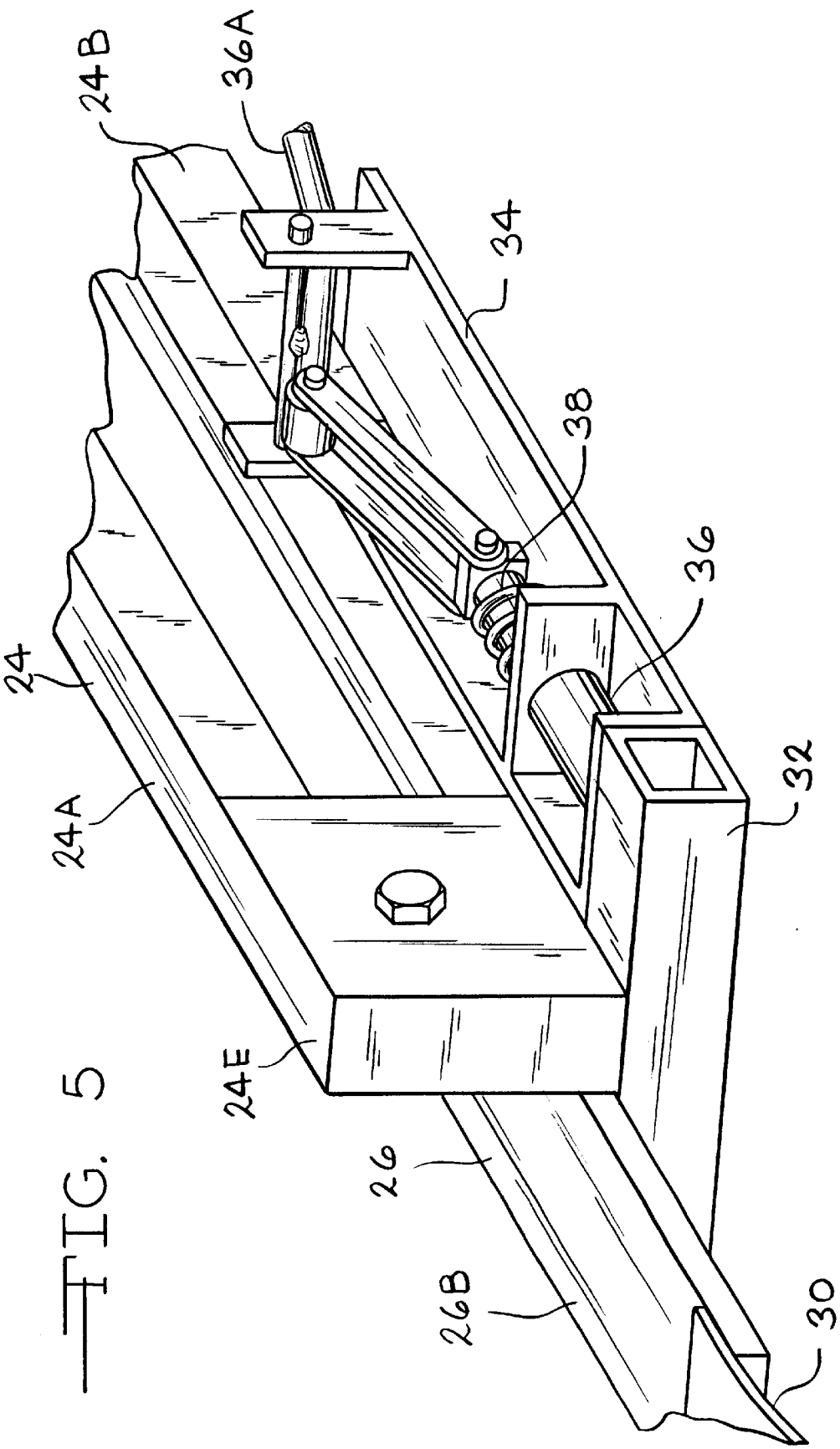
FIG. 5 is an enlarged partial view showing the locking mechanism 34 in the locked position.
Figure 6:
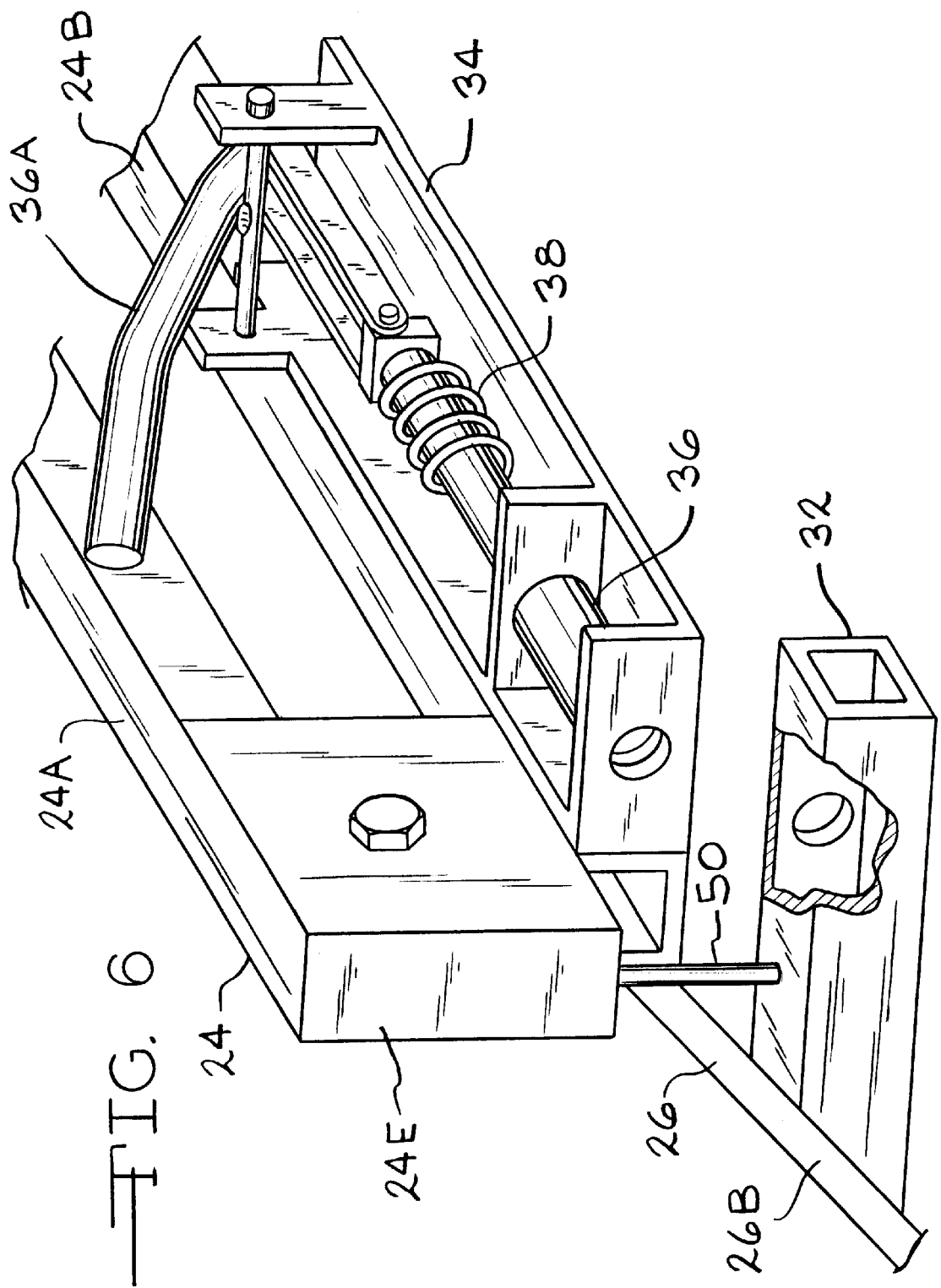
FIG. 6 is an enlarged partial view showing the locking mechanism 34 in the unlocked position.

A locking mechanism 34 is preferably provided adjacent the second end 24E of each side rail 24 (FIGS. 5 and 6). The locking mechanism 34 includes a locking pin 36 around which is mounted a spring 38. The locking pin 36 has a handle 36A which allows for moving the pin 36 into and out of the locked position. The locking mechanism 34 is mounted on the side rail 24 such that the pin 36 can be extended beyond the second end 24E of the side rail 24 and into the end of the cross bar 32 when the locking mechanism 34 is in the locked position. Alternatively, a single locking mechanism 34 mounted on either side rail 24 could be used. Although the above locking mechanism 34 is preferred, any well known locking mechanism can be used.

A pulley and cable system 40 is preferably used to raise and lower the back portion 26B of the bed 26. The system 40 includes a pair of first pulley wheels 42 rotatably mounted in the enlarged second ends 24E of the upper side rails 24A (FIG. 3). The first pulley wheels 42 are mounted such that the axle 42A of the wheels 42 extends horizontally, perpendicular to the length of the side rails 24 (FIG. 4). The system 40 also includes a pair of second pulley wheels 44 located in the upper front rail 22A at each end adjacent the side rails 24. The second pulley wheels 44 are mounted such that the axle 44A of the wheels 44 extend vertically, perpendicular to the axle 16 of the first pulley wheels 42 and to the front rail 22 of the frame 12 of the trailer 10 (FIG. 3). The system 40 also has a pair of third pulley wheels 46 mounted adjacent each other in the upper front rail 22A spaced an equal distance from the center of the front rail 22. The third pulley wheels 46 are mounted similarly to the second pair of pulley wheels 44 such that the axle 46A of the wheels 46 extend vertically, perpendicular to the front rail 22 of the frame 12 of the trailer 10 (FIG. 3). In the preferred embodiment, the third pulley wheels 46 are mounted inline with the second pulley wheels 44 such that the pulley wheels 44 and 46 are aligned across the length of the front end 12A of the trailer 10. However, the third wheels 46 could also be offset from the second pulley wheels 44. The pulley wheels 42, 44 and 46 are provided with grooves (not shown) around their circumference to allow the cable 50 to be securely extended around the circumference of the pulley wheels 42, 44 and 46 and to prevent the cable 50 from slipping off of the pulley wheels 42, 44 or 46. In the first embodiment, a single cable 50 is positioned around all the pairs of pulley wheels 42, 44 and 46. The cable 50 is mounted at each end to the ends of the cross bar 32 on the back portion 26B of the bed 26 (FIG. 4). The ends of the cable 50 are preferably adjustably secured to the cross bar 32 of the back end 26B of the bed 26, to allow for adjusting the tension in the cable 50 such as when the cable 50 may stretch in length over time. The cable 50 extends upward vertically from the ends located in the cross bar 32 on the back portion 26B of the bed 26 and around the circumference of the first pulley wheels 42. As the cable 50 extends around the first pulley wheels 42, the direction of travel of the cable 50 is changed 90° such that the cable 50 extends in the horizontal direction toward the front end 12A of the frame 12 (FIG. 3). The cable 50 extends the complete length of the side rails 24 and around the second pulley wheels 44. As the cable 50 extends around the second pulley wheels 44, the direction of travel of the cable 50 again changes direction 90°. Thus, the cable 50 extends inward toward the center of the front rail 22 and the third pulley wheels 46. The cable 50 extends around the third pulley wheels 46 in opposite directions such that the center of the cable 50 can be pulled between the third pulley wheels 46. The third pulley wheels 46 also change the direction of the cable 50 90° such that the cable 50 extends around the third pulley wheels 46 and outward horizontally between the third pulley wheels 46 away from the front end 12A of the frame 12. In the first embodiment, the center of the cable 50 extends through an opening in the sidewalls of the front rail 22 (FIG. 3). The third pulley wheels 46 are preferably positioned such that the portion of the cable 50 which is extended outward extends outward along the tongue 14 of the trailer 10. The center of the cable 50 which extends outward beyond the third pulley wheels 46 is provided with a connector 58. The connector 58 is fixably mounted to the cable 50 at one end and has a pulley wheel 58A rotatably mounted at the other end. The connector 58 allows the cable 50 to be easily attached to a winch 52. The winch 52 is preferably mounted on the tongue 14 of the trailer 10 and is similar to a standard winch used as come along for loading boats onto boat trailers. The winch 52 includes a winch cable 54 which is connected at one end to the winch wheel 56. The winch cable 54 extends from the winch wheel 56 over the pulley wheel 58A of the connector 58 and is fastened to the tongue 14 of the trailer 10. Thus, as the winch wheel 56 is rotated, the winch cable 54 is pulled inward which pulls the connector 58 and cable 50 toward the winch 52. The winch 52 has a handle 60 which allows for manually rotating the winch wheel 56 to tighten or pull in the cable 50. The winch 52 uses a rachet (not shown) for easier tightening of the cable 50. The winch 52 preferably has a 2:1 ratio such as to make the cable 50 easier and quicker to tension.

Figure 7:
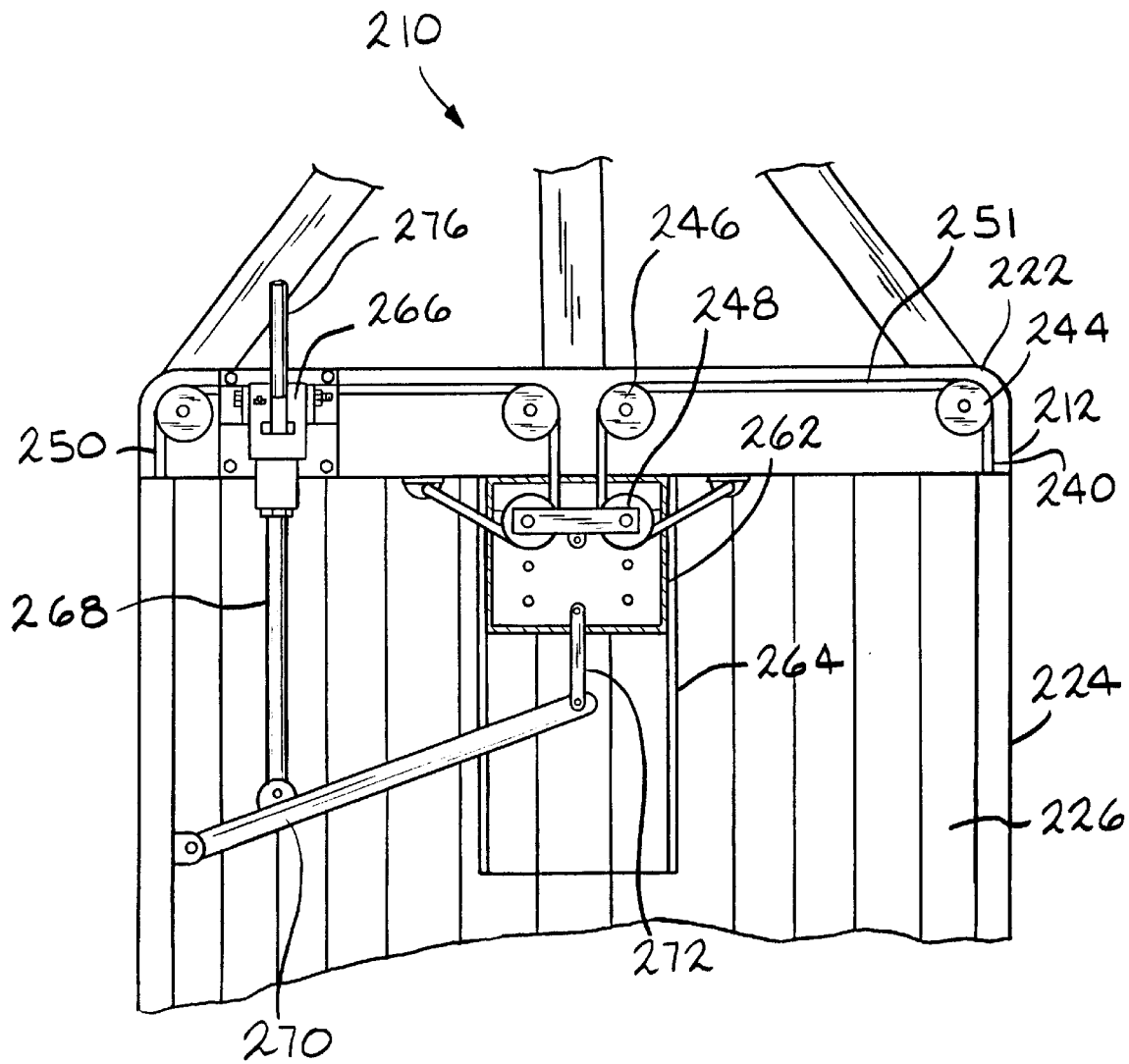
FIG. 7 is a bottom view of the trailer 210 of the second embodiment with the back portion of the bed 226 in the lowered position showing the hydraulic winch 266.
Figure 8:
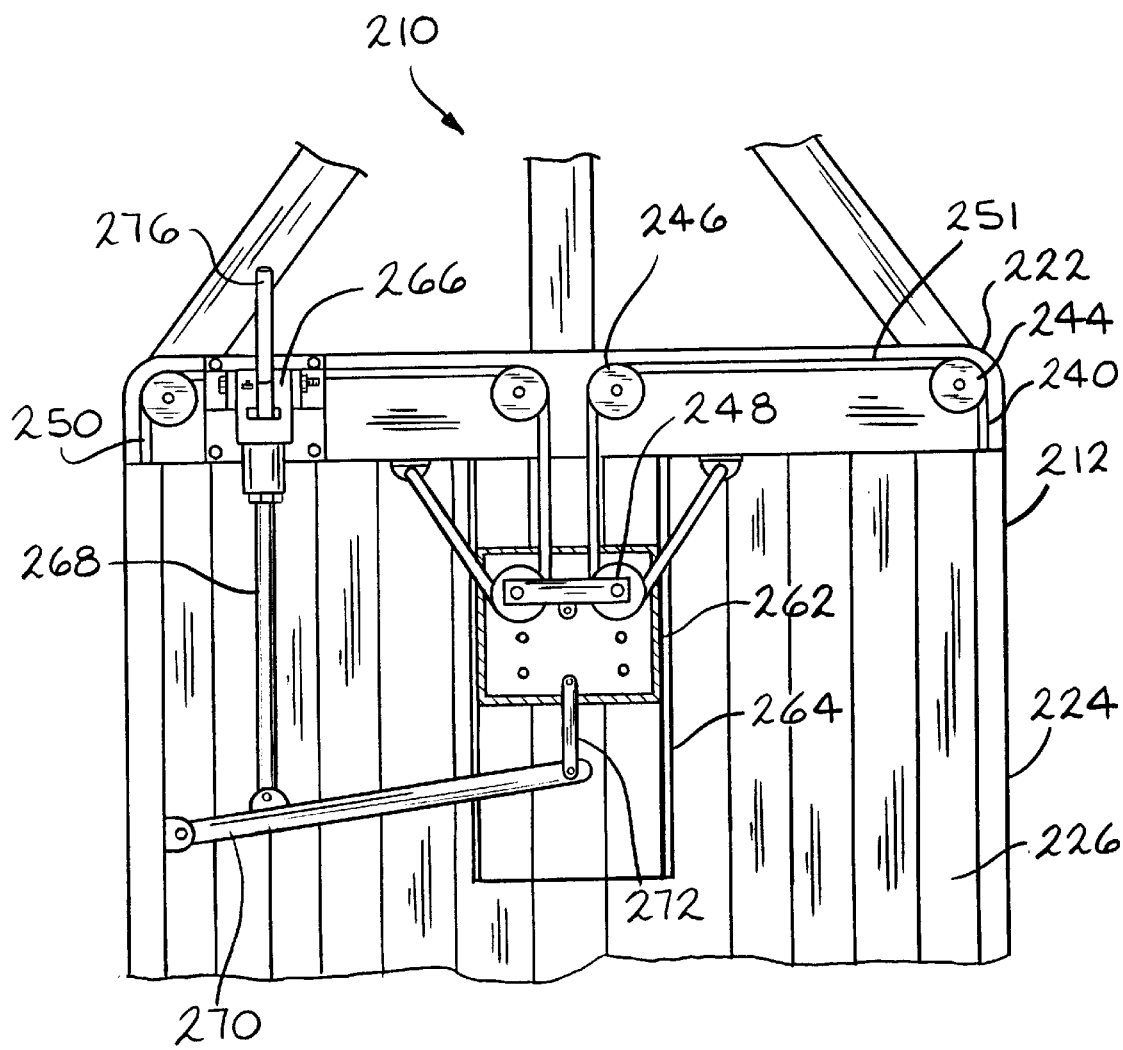
FIG. 8 is a bottom view of the trailer 210 of the second embodiment with the back portion of the bed 226 in the raised position showing the hydraulic winch 266.

In a second embodiment, the pulley and cable system 240 uses two cables 250 and 251 with a hydraulic winch 266 to tighten the cables 250 and 251 (FIGS. 7 to 8). In the second embodiment, the first, second and third pulley wheels (not shown), 244 and 246 are positioned similar to the first embodiment. The cables 250 and 251 of the second embodiment are connected at the first ends to the cross bar (not shown) on the back portion (not shown) of the bed 226 and extend around the first pulley wheels and second pulley wheels 244 similar to the first embodiment. However, the cables 250 and 251 extend around the third pulley wheel 246 in a direction opposite from the first embodiment. As the cables 250 and 251 extend around the third wheel 246, the direction of the cables 250 and 251 is changed 90°. However, in contrast to the first embodiment, the cables 250 and 251 extend around the third pulley wheel 246 and are directed inward toward the axle (not shown) of the wheels (not shown) of the trailer 210 (FIGS. 7 and 8). The cables 250 and 251 extend inward and around a pair of fourth pulley wheels 248. As the cables 250 and 251 extend around the fourth pulley wheels 248, the direction of travel of the cables 250 and 251 is again changed. The second ends of the cables 250 and 251 are extended around the fourth pulley wheels 248 and are fastened onto the front rail 222 of the trailer 210. The pair of fourth pulley wheels 248 are mounted on a sliding carriage 262 which is able to slide along a track 264 toward and away from the front rail 222 of the trailer 210 (FIGS. 7 and 8). Preferably, the carriage 262 has a bottom wall (not shown) which prevents dirt and debris from entering the system 240 and also prevents interference with the system 240. The carriage 262 is moved by the hydraulic winch 266 which is mounted on the bottom surface of the trailer 210 adjacent the front rail 222 and one of the side rails 224 (FIGS. 7 and 8). The hydraulic winch 266 includes a post 268 which can be retracted or extended by moving the handle 276 of the winch 266 up and down. The hydraulic winch 266 is preferably similar to a standard hydraulic jack. The end of the post 268 of the winch 266 is pivotably connected to an arm 270. The arm 270 is pivotably connected at one end to a side rail 224 of the trailer 210. The other end of the arm 270 is pivotably connected to one end of a connection rod 272. The other end of the connection rod 272 is pivotably connected to the carriage 262. The post 268 is preferably pivotably connected to the arm 270 adjacent the end pivotably mounted on the side rail 224.

Figure 9:
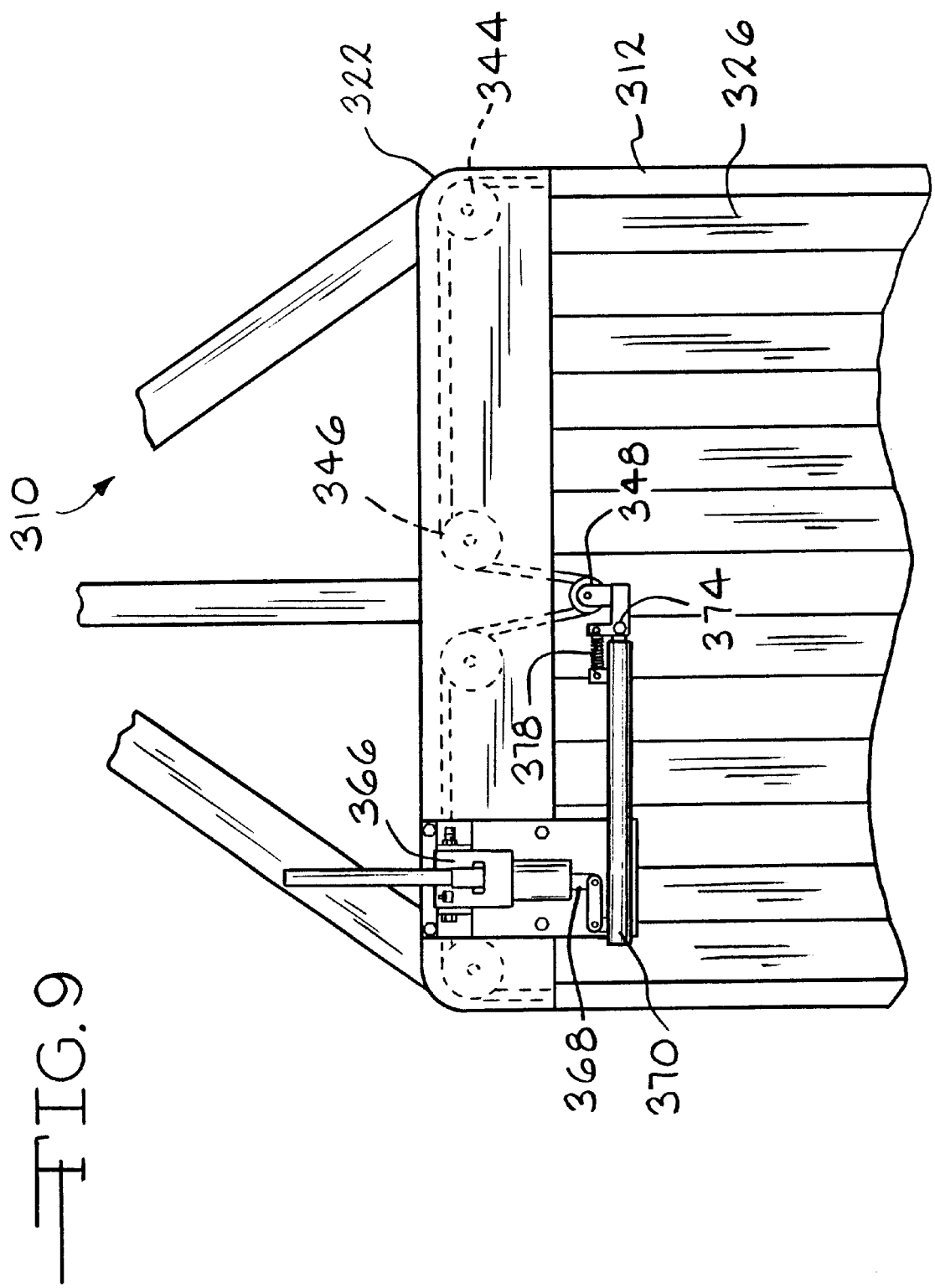
FIG. 9 is a bottom view of the third embodiment with the back portion of the bed 326 in the lowered position showing the hydraulic winch 366 and the bracket 374.
Figure 10:
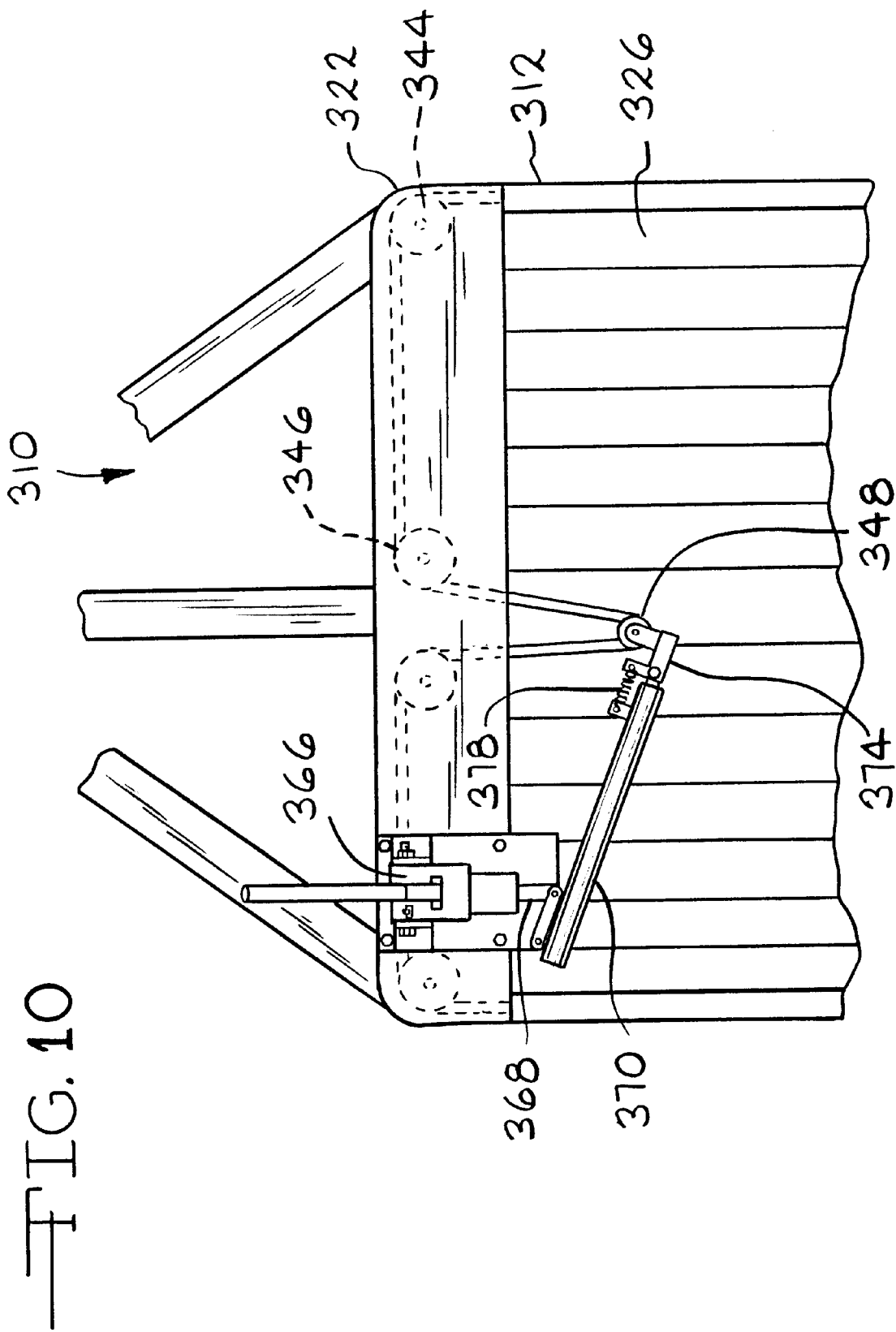
FIG. 10 is a bottom view of the third embodiment with the back portion of the bed 326 in the raised position showing the hydraulic winch 366 and the bracket 374.

In a third embodiment, similar to the second embodiment, a hydraulic winch 366 is used to tighten the cable 350 (FIGS. 9 and 10). In the third embodiment, similar to the first embodiment, a single cable 350 is preferably used. Preferably, the cable 350 extends around the first pulley wheels (not shown) and the second pulley wheels 344 similar to the first and second embodiments. However, as the cable 350 extends around the third pulley wheels 346, the cable 350 extends inward toward the axle (not shown) of the trailer 310. The cable 350 preferably extends around a fourth pulley wheel 348 which is positioned between the third pulley wheels 346 and spaced inwardly toward the axle of the trailer 310. The fourth pulley wheel 348 is rotatably mounted in a bracket 374. The fourth pulley wheel 348 of the third embodiment is preferably smaller in diameter than the rest of the pulley wheels 344 and 346. The hydraulic winch 366 is preferably similar to the hydraulic winch 266 of the second embodiment. The end of the post 368 is pivotably connected to an arm 370 adjacent one end of the arm 370. The bracket 374 having the fourth pulley wheel 348 is pivotably mounted on the other end of the arm 370. A spring is preferably provided between the bracket 374 and the end of the arm 370 to provide resistance against the pivoting of the bracket 374 on the arm 370. In the second and third embodiments, the hydraulic winch 266 and 366 can be manually operated or can be electrically operated.

In all embodiments, the first, second and third pulley wheels 42, 44, 46, 244, 246, 344 and 346 preferably have the same diameter for ease of construction. Preferably, the first, second and third pulley wheels 42, 44, 46, 244, 246, 344 and 346 of all embodiments have a diameter of 4.0 inches (10.04 cm). The cables 50, 250, 251 and 350 are preferably constructed of 0.1875 inch (0.4763 cm) steel wrapped cable and can be coated to reduce friction during use. The pulley wheels 42, 44, 46, 244, 246, 344 and 346 preferably rotate to allow for smoother movement of the cables 50, 250, 251 and 350 and less wear on the cables 50, 250, 251 and 350.

IN USE

In general, the trailer 10, 210 and 310 of the present invention is used similarly to a standard trailer during transportation of a load. However, use of the trailer 10, 210 and 310 during loading and unloading is different. In the preferred embodiment, the trailer 10, 210 or 310 can be loaded or unloaded either while the trailer 10, 210 or 310 is hitched to a vehicle (not shown) or when the trailer 10, 210 or 310 is unhitched from a vehicle and is supported by a jack stand (not shown).

In all embodiments, to load the trailer 10, the locking mechanisms 34 are unlocked to release the back portion 26B of the bed 26, 226 or 326. To unlock the locking mechanisms 34, the handle 36A of the locking pin 36 is rotated upward which releases the pin 36 and allows the spring 38 to move the pin 36 back out of the cross bar 32 on the back portion 26B of the bed 26 (FIG. 6). Once the back portion 26B is unlocked, the back portion 26B is lowered using the winch 52 or the hydraulic winch 266 or 366 to relieve tension or slacken the cable or cables 50, 250, 251 or 350.

In the first embodiment, the cable 50 is loosened by undoing the rachet on the winch 52 such that the winch wheels 56 is able to move freely. The weight of the back portion 26B of the bed 26 pulls the cable 50 causing the connector 58 to move toward the front rail 22 of the frame 12 which causes the winch cable 54 to unwind from around the winch wheel 56. This allows the back portion 26B of the bed 26 to be lowered to the ground surface 100. The user can control the lowering of the back portion 26B of the bed 26 by controlling the rotation of the winch wheel 56 to prevent the back portion 26B from lowering too quickly.

In the second embodiment, the back portion of the bed 226 is lowered similarly to the first embodiment. The hydraulic winch 266 is activated such that the post 268 of the winch 266 is retracted (FIG. 7). As the post 268 moves inward, the arm 270 attached to the post 268 pivots about the end mounted on the side rail 224. As the arm 270 pivots, the second end of the arm 270 moves toward the front rail 222 of the frame 212 which in turn moves the carriage 262 toward the front rail 222 of the frame 212 (FIG. 7). As the carriage 263 moves, the cables 250 and 251 become loose which allows the end of the back portion of the bed 226 to move downward due to gravity.

In the third embodiment, the hydraulic winch 366 is used similarly to the hydraulic winch 266 of the second embodiment. To lower the back portion of the bed 326, the post 368 of the hydraulic winch 366 is retracted (FIG. 9). Retracting the post 368 pulls the arm 370 connected to the post 368 and having the fourth pulley wheel 348 at one end toward the front rail 322 of the frame 312. Moving the fourth pulley wheel 348 loosens the cable 350 and allows the back portion of the bed 226 to be lowered due to gravity.

The back portion 26B of the bed 26, 226 or 326 is in the fully lowered position when the end ramp 30 rests on the ground surface 100. Once the back portion 26B is completely lowered, the winch 52, 266 or 366 is locked to prevent additional downward movement of the back portion 26B of the bed 26, 226 or 326. In the preferred embodiment, when the back portion 26B of the bed 26, 226 or 326 is completely lowered, the entire back portion 26B of the bed 26, 226 or 326 forms a ramp from the ground surface 100 to the front portion 26A of the bed 26,. 226 or 326. Preferably, the angle of the back portion 26B of the bed 26, 226 or 326 is approximately in the range of between 10° and 20° in the fully lowered position. However, it is understood that the exact angle between the ground surface 100 and the back portion 26B varies depending on the height of the axle 16 of the trailer 10 and the length of the back portion 26B of the bed 26, 226 or 326. In the preferred embodiment, the end of the back portion 26B of the bed 26, 226 or 326 can be lowered a total distance of about 25.0 inches (63.5 cm) (FIG. 2).

Once the back portion 26B is in the fully lowered position, the load (not shown) is moved onto the bed 26, 226 or 326. In the first embodiment, the end of the winch cable 54 can be disconnected and released from the connector 58 and the winch 52 and winch cable 54 can then be used similar to a standard come along to move the load onto the bed 26, 226 or 326 of the trailer 10. In the preferred embodiment, the load on the back portion 26B of the bed 26, 226 or 326 does not change the orientation of the back portion 26B of the bed 26, 226 or 326.

In the first embodiment, to raise the back portion 26B of the bed 26, the winch 52 is preferably rotated in the direction which winds the winch cable 54 around the winch wheel 56 this moves the connector 58 away from the front rail 22 of the frame 12 which tightens the cable 50 which lifts the end of the back portion 26B of the bed 26.

To raise the back portion of the bed 226 in the second embodiment, the post 268 of the hydraulic winch 266 is extended (FIG. 8). Extending the post 268 pivots the arm 270 about the side rail 224 and moves the end of the arm 270 connected to the carriage 262 away from the front rail 222 of the frame 212. Moving the carriage 262 tightens the cables 250 and 251 which lifts the end of the back portion.

In the third embodiment, to raise the bed 326, the post 368 of the winch 366 is extended (FIG. 10). Extending the post 368 moves the arm 370 and the fourth pulley wheel 348 away from the front rail 322 of the frame 312 which pulls on the cable 350. Pulling on the cable 350 lifts the back portion of the bed 326. The pivoting bracket 374 with the spring 378 prevents the winch 366 and arm 370 from continuing to pull the cables 350 on the back portion of the bed 326 when in the fully raised position. If the hydraulic winch 366 continues to move after the back portion of the bed 326 is raised, the spring 378 is compressed which allows the bracket to pivot preventing the cable 350 from being pulled further. This pivoting bracket and spring can also be used on the arm 270 in the second embodiment.

In all embodiments, when the back portion 26B of the bed 26, 226 or 326 is raised, the load is raised along with the back portion 26B. The pulley and cable system 40, 240 or 340 and the placement of the hinges 28 allows the back portion 26B with the load to be easily lifted. The use and positioning of the pulley wheels 42, 44, 46, 244, 246, 344 or 346 allows for the horizontal force created by the user at the winch 52, 266 or 366 to be used to vertically lift the back portion 26B of the bed 26, 226 or 326 of the trailer 10, 210 or 310 with the load. The pivot point for the bed 26, 226 and 326 is preferably spaced between the front rail 12, 212 and 312 of the trailer 10, 210 and 310 and the axle 16 of the trailer 10, 210 and 310. The positioning of the pivot point of the back portion 26B of the bed 26, 226 or 326 a distance away from the end of the back portion 26B creates a greater lever arm which allows a smaller force to be used to raise the back portion 26B of the bed 26, 226 or 326. Preferably, the use of the cable and pulley system 40, 240 and 340 and the positioning of the pivot point of the back portion 26B of the bed 26, 226 and 326 allows the back portion 26B of the bed 26, 226 and 326 to be easily lifted using only a small force even when a load is located on the back portion 26B of the bed 26. The back portion 26B is in the fully raised position when the ends of the cross bar 32 are adjacent and in contact with the end of the side rail 24, 224 and 324. Once the back portion 26B is fully raised, the pin 36 of the locking mechanism 34 is moved back into the locked position (FIG. 5). The winch or hydraulic winch 52, 266 and 366 can then be backed off such as to release the tension in the cables 50, 250, 251 and 350. This reduces the risk of damage to the cables 50, 250, 251 and 350 during transportation of the load.

It is intended that the foregoing description be only illustrative of the present invention and that the present invention be limited only by the hereinafter appended claims.

I claim:

1. A trailer which comprises:
   (a) a frame having a first end and a second end with side members extending therebetween;
   (b) a tongue assembly mounted on the first end of the frame;
   (c) a single axle having opposed ends and attached to and extending between the side members of the frame spaced apart from the first end of the frame with wheels rotatably mounted on the opposed ends of the axle adjacent the side members of the frame;
   (d) a bed having a first portion and a second portion, each portion having first and second ends, the first portion being mounted at the first end to the first end of the frame and the second end of the first portion being pivotably connected at a connection point to the first end of the second portion wherein the connection point of the first and second portions of the bed is located adjacent the axle between the first end of the frame and the axle; and (e) pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a lifting means mounted on the second end of the frame and connected to the second portion of the bed.

2. The trailer of claim 1 wherein the lifting means includes a cable connected to the second end of the second portion of the bed.

3. A trailer which comprises:

(a) a frame having a first end and a second end with side members extending therebetween;

(b) a tongue assembly mounted on the first end of the frame;

(c) an axle having opposed ends and attached to and extending between the side members of the frame spaced apart from the first end of the frame with wheels rotatably mounted on the opposed ends of the axle adjacent the side members of the frame;

(d) a bed having a first portion and a second portion, each portion having first and second ends, the first portion being mounted at the first end to the first end of the frame and the second end of the first portion being pivotably connected at a connection point to the first end of the second portion wherein the connection point of the first and second portions of the bed is located adjacent the axle between the first end of the frame and the axle; and (e) pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a cable having opposed ends and attached at one end to the second portion of the bed, a winch means attached to the other end of the cable and mounted adjacent the first end of the first portion of the bed for tightening and loosening the cable and a first cable guide mounted adjacent the second end of the frame wherein the cable extends over the first cable guide and wherein the first cable guide acts to change a direction of the cable.

4. The trailer of claim 3 wherein the second end of the second portion is provided with a ramp to allow easy loading of the trailer.

5. The trailer of claim 3 wherein the pivoting means includes two cables having opposed ends and extending along each of the side members of the frame and a pair of first cable guides mounted on the second end of the frame adjacent each of the side members.

6. The trailer of claim 5 wherein the side members are hollow and the cables are located within the side members.

7. The trailer of claim 5 wherein the pivoting means includes a pair of second cable guides mounted at the first end of the frame adjacent each of the side members and wherein the second cable guides change the direction of the cables such that the cables are orientated toward the opposite side members of the frame.

8. The trailer of claim 7 wherein the pivoting means includes a pair of third cable guides mounted at the first end of the frame and spaced apart from the side members of the frame wherein the third cable guides change the direction of the cables such that the cables extend outward from the first end of the frame away from the second end of the frame.

9. The trailer of claim 3 wherein a second cable guide is mounted adjacent the first end of the frame to change a direction of the cable.

10. The trailer of claim 9 wherein a third cable guide is mounted at the first end of the frame spaced apart from the side members and wherein the third cable guide changes the direction of the cable.

11. The trailer of claim 10 wherein a fourth cable guide is mounted adjacent the third cable guide on a side opposite the first end of the frame and wherein the fourth cable guide changes the direction of the cable.

12. The trailer of claim 3 wherein the cable extends along the side members of the bed and wherein the first cable guide changes the direction of the cable such that the cable extends downward toward the ground surface.

13. The trailer of claim 3 wherein the first portion and the second portion of the bed are connected together by a hinge.

14. The trailer of claim 3 wherein the first portion of the bed has opposed sides which extend between the ends and wherein the sides of the bed are secured to the side members of the frame.

15. The trailer of claim 3 wherein a locking means is mounted on the second end of the frame for securing the second end of the second portion of the bed to the second end of the frame when the second portion is in the raised position.

16. The trailer of claim 15 wherein the locking means includes a pin assembly which is mounted to the side member of the frame and wherein to place the locking means in a locked position, the pin assembly is moved so as to extend a pin into a hole in the second portion of the bed.

17. The trailer of claim 3 wherein a pair of locking means are mounted on each of the side members adjacent the second end of the frame for securing the second end of the second portion of the bed to the side members when the second portion is in the raised position.

18. The trailer of claim 3 wherein the winch means is moved by a hydraulic means for allowing easier tightening of the cable.

19. The trailer of claim 3 wherein the winch means is mounted on the tongue assembly.

20. The trailer of claim 3 wherein an end member having opposed ends is mounted on the second portion of the bed at the second end and extends between and beyond the side members of the frame and wherein the end of the cable is connected to the end member.

21. A trailer which comprises:

(a) a frame having a first end and a second end with side members extending therebetween;

(b) a tongue assembly mounted on the first end of the frame;

(c) a single axle having opposed ends and attached to and extending between the side members of the frame spaced apart from the first end of the frame with wheels rotatably mounted on the opposed ends of the axle adjacent the side members of the frame;

(d) a bed having a first portion and a second portion, each portion having first and second ends, the first portion being mounted at the first end to the first end of the frame and the second end of the first portion being pivotably connected at a connection point to the first end of the second portion wherein the connection point of the first and second portions of the bed is located adjacent the axle between the first end of the frame and the axle; and (e) pivoting means for pivoting the second portion of the bed from a raised position with the first and second portions of the bed in a same plane to a load position with the second end of the second portion adjacent a ground surface such that the second portion of the bed extends between the ground surface and the second end of the first portion at an angle, the pivoting means including a pair of cables having opposed ends and extending from the first end of the frame to the second end of the frame along each of the side members, a winch means connected to one end of the cables for tightening and loosening the cables and at least one pair of cable guides for changing the direction of the cables.

22. The trailer of claim 21 wherein the cables are connected together at one end adjacent the winch means such as to form a single cable wherein when the winch means is activated, the cables move in unison.

23. The trailer of claim 21 wherein the pair of cable guides are mounted at the second end of the frame adjacent each of the side members and wherein as the cables extend over the first cable guides, the cables change direction.

24. The trailer of claim 23 wherein the pivoting means includes a pair of second cable guides mounted at the first end of the frame adjacent each of the side members and wherein as the cables extend over the second cable guide the cables change direction.

25. The trailer of claim 24 wherein the pivoting means includes a pair of third cable guides mounted at the first end of the frame spaced apart from each of the side members and wherein as the cables extend over the third cable guide the cables change direction.

* * * * *